Sept. 7, 1937.  A. BRAASCH  2,092,151
PROCESS FOR THE FINE BUBBLE AERATION OF DIAPHRAGM FERMENTING VATS
Filed Feb. 18, 1936
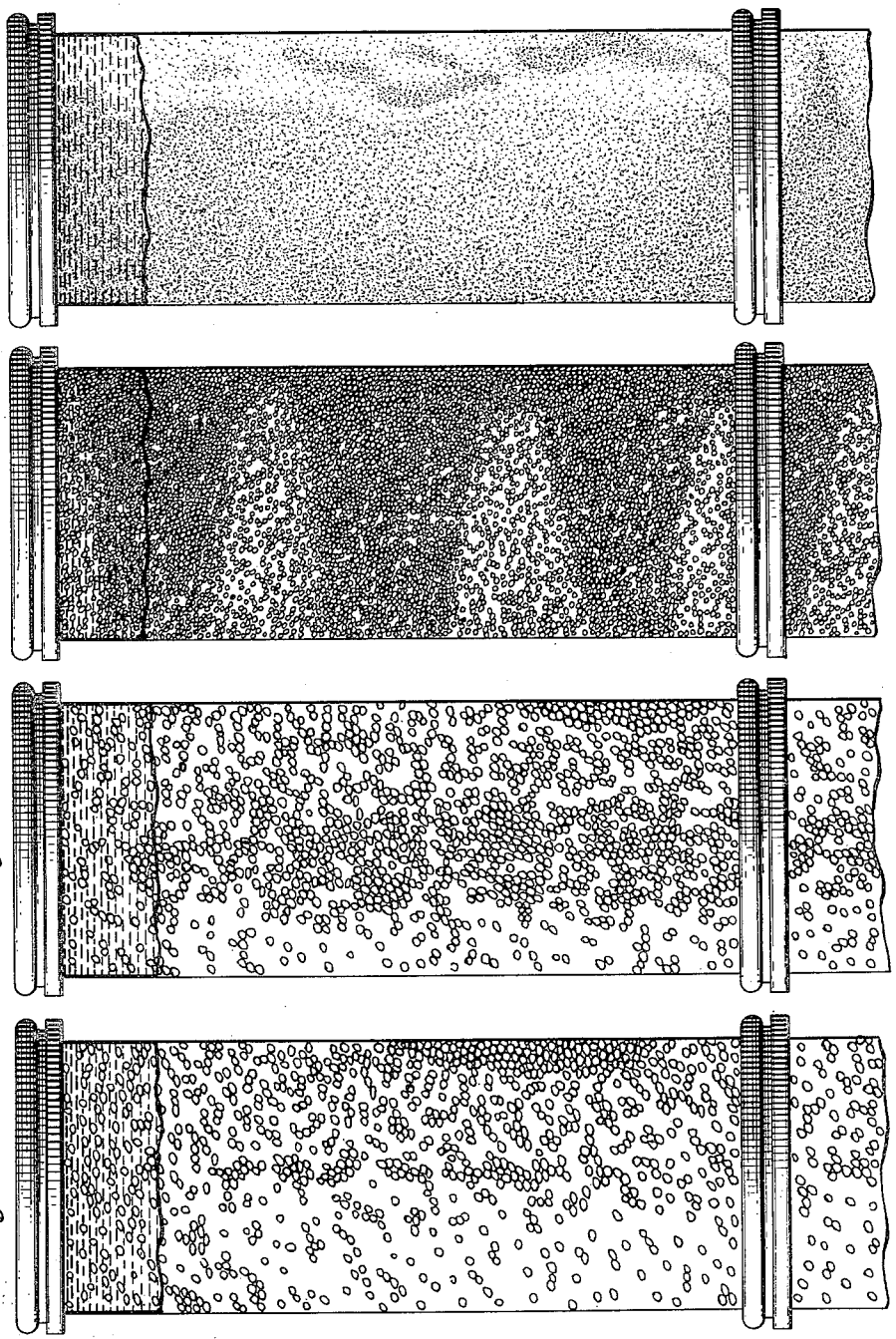
INVENTOR
ARNOLD BRAASCH
BY
Watson, Bristol, Johnson & Leavenworth
ATTORNEYS Patented Sept. 7, 1937

2,092,151

UNITED STATES PATENT OFFICE 2,092,151

PROCESS FOR THE FINE-BUBBLE AERATION OF DIAPHRAGM FERMENTING VATS

Arnold Braasch, Neumunster, Germany, assignor to Standard Brands Incorporated, New York, N. Y., a corporation of Delaware Application February 18, 1936, Serial No. 64,453
In Germany January 9, 1932

6 Claims. (Cl. 195—95)

This invention relates to a procedure for aerating a body of liquid with a finely divided aerating medium. More particularly, it relates to a process for the propagation of yeast with aeration in which introduced air is highly comminuted and includes correlated improvements and discoveries whereby the aeration of a liquid is enhanced and the production of yeast augmented. When a fermenting liquid or wort containing a yeast and yeast nutrient is aerated by means of diaphragms of very fine porosity (e. g., as described in U. S. Patent No. 1,792,450) so that an extremely fine distribution of air is obtained, yeast of good quality and in an increased quantity is produced. It is known to add lactic acid to fermenting liquids or to produce lactic acid in such liquids for the purpose of obtaining a better breaking up of the protein substances or to suppress injurious bacterial infections. Such additions of lactic acid have been preferably made to highly concentrated worts, especially grain mashes, for the reason that therein the breaking up or disintegration of the protein substances is of especial importance. In actual practice, however, this method of adding lactic acid has been dispensed with since the use of molasses worts has gradually increased and inasmuch as such worts are employed only in a dilute form.

For neutralizing the alkalinity of these worts, inorganic acids, preferably such as sulphuric acid, have been used. I have now found that sulphuric acid has no influence in reducing the surface tension of the fermenting liquid or wort.

It is an object of the invention broadly to provide a process in accordance with which a liquid medium may be aerated with an aerating agent as air or other suitable gaseous body in a highly sub-divided condition. A further object of the invention is the provision of a procedure whereby aeration of a liquid medium is rendered more effective by reducing the surface tension thereof by means of a suitable organic acid. Another object of the invention is to provide a process for aerating a nutrient medium in which yeast is being propagated with air in a finely comminuted form. A specific object of the invention is to occasion a reduction of the surface tension of a medium in which yeast is effecting a fermentation or is being propagated and which is subjected to fine bubble aeration by having present therein a small amount of an organic acid.

Other objects of the invention will in part be obvious and will in part appear hereinafter.

The invention accordingly comprises the several steps and the relation of one or more of such steps with respect to each of the others thereof, which will be exemplified in the process hereinafter disclosed, and the scope of the invention will be indicated in the claims.

I have found that relatively very small quantities of an organic acid belonging to the group lactic acid and acetic acid in a liquid medium which is undergoing aeration have the effect of producing an exceedingly fine subdivision of the air through reduction of surface tension whereby the effectiveness of aerating by means of very finely distributed bubbles is substantially improved. According to my invention a further increase in the output of yeast of good quality can be obtained if in the yeast containing fermenting liquid there is present an organic acid as lactic acid and acetic acid, which reduces the surface tension of the fermenting liquid.

A similar result could be attained with inorganic acids only if there were sufficient salts of the organic acids present in the fermenting liquid, so that these organic acids would be liberated, e. g., by sulphuric acid and could then exert the desired action with respect to reducing the surface tension, according to the present process.

For example, very favorable results were obtained by acidifying a molasses wort with a quantity of lactic acid such that the wort had an acidity of about 0.2 cc. normal sodium hydroxide for each 20 cc. of nutrient solution. The required lactic acid may either be added as such or, as is preferable in many cases, may be produced by a special lactic acid fermentation of a portion of the material treated.

A series of experiments is described hereinafter which show how greatly the size of the bubbles may be influenced by changing the surface tension of a liquid. The height of the ascending chamber in centimeters is taken as the standard of the amount of air distributed in the liquid.

The experimental receptacle is a large glass cylinder 3 meters high and 19 cm. in diameter. In all experiments this receptacle contained the same quantity of liquid (60 liters); the liquid level without air was 210 cm.

*Experimental series I*

| No. | Contents | Amount of air per hour in liters | Additions | 1/1 N NaOH per 20 cc. | Cm. ascent |
|---|---|---|---|---|---|
| 1 | 60 liters of water. | 500 | None | | 4 |
| 2 | do | 500 | 0.01% lactic acid | | 5 |
| 3 | do | 500 | 0.02% lactic acid | | 6 |
| 4 | do | 500 | 0.04% lactic acid | 0.05 | 16 |
| 5 | do | 500 | 0.08% lactic acid | 0.1 | 18 |
| 6 | do | 500 | 0.12% lactic acid | 0.2 | 24 |

*Experimental series II*

In these experiments, quantities of molasses such as are used in practice at the beginning of a yeast fermentation were added to the water. The following table shows how much greater the ascent is when lactic acid is used instead of sulphuric acid.

| No. | Contents | Amount of air per hour in liters | Additions | 1/1 N NaOH per 20 cc. | Cm. ascent |
|---|---|---|---|---|---|
| 7 | 60 liters of water and molasses. | 500 | 300 g. molasses neutralized with $H_2SO_4$. | | 6 |
| 8 | do | 500 | Acidified with $H_2SO_4$. | 0.1 | 17 |
| 9 | do | 500 | do | 0.2 | 17 |
| 10 | do | 500 | 600 g. molasses neutralized with $H_2SO_4$. | | 15 |
| 11 | do | 500 | Acidified with $H_2SO_4$. | 0.05 | 24 |
| 12 | do | 500 | do | 0.2 | 35 |
| 13 | do | 500 | 300 g. molasses neutralized with $H_2SO_4$ and acidified with lactic acid. | 0.1 | 38 |
| 14 | do | 500 | do | 0.2 | 49 |
| 15 | 60 liters of water and molasses. | 500 | 600 g. molasses neutralized with $H_2SO_4$ and acidified with lactic acid. | 0.05 | 34 |
| 16 | do | 500 | do | 0.2 | 56 |

These experiments clearly show the action of lactic acid in the presence of molasses. There was no increase of the ascend-space even with strong acidification with sulphuric acid only. In Experiments 13 to 16 the fermenting liquid, by reason of an addition of lactic acid, was a white milky mass, the air bubbles were scarcely perceivable with the naked eye.

The effectiveness in reducing surface tension of a liquid by having present in said liquid a small amount of lactic or acetic acid is demonstrably shown in the drawing in which Fig. 1 depicts aeration of water through the introduction of air in the form of bubbles of the usual aerating size, that is, about 0.5 mm. diameter.

Fig. 2 shows aeration of water as depicted in Fig. 1, but with the addition to the water of 0.12% of lactic acid.

Fig. 3 shows the effect of aerating water with the same volume of air per unit of time as in Figs. 1 and 2, but differing therefrom in that the air is introduced by means of a diaphragm having very fine porosity (e. g., having pores less than 6 mu. in diameter), and Fig. 4 illustrates the same aeration as in Fig. 3 but with the addition of 0.12% of lactic acid.

These figures distinctly show the effect of the addition of a small amount of lactic acid upon the bubble size when a liquid is aerated by means of fine bubble aeration. They also distinctly show that when a liquid is aerated with bubbles of the usual aerating size, there is no effect upon bubble size when the liquid contains a small amount of lactic acid. The introduction of lactic acid into the medium which is being or is to be aerated with fine bubble aeration, results in a further marked comminution of the introduced air and this renders possible a decided reduction in the amount of air necessary with an accompanying saving in power requirement and this is effected without in any way reducing the quantity or quality of yeast when a wort or fermenting liquid is so treated.

As indicated above, and illustrated by worts for yeast propagation or manufacture, the reduction of surface tension by lactic acid or acetic acid may be utilized for the aeration of various liquid media as in the carbonation of liquids, the contacting of gases and liquids as in scrubbing operations, and the like. The air or other gas may be introduced through diaphragms of fine porosity so that bubbles having diameters upwards to 6 mu. are produced.

The action or result of my process is sharply distinguished from the known processes in which the entire fermenting liquid is converted into foam through the addition of foam forming substances such as, for example, saponines. By such process there is not obtained the fine distribution or high comminution of the air bubbles as results in a carrying out of the procedure hereinbefore described.

Since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

This application is in part a continuation of my copending application Serial No. 649,235, filed December 28, 1932.

I claim:

1. In a process for contacting gases with liquids, the improvement which comprises adding an organic acid belonging to the group consisting of acetic and lactic acid to a liquid medium with which gas is to be contacted, and contacting a gaseous body with the liquid so treated in the form of minute bubbles having diameters upwards to 6 mu., whereby the surface tension of the liquid is reduced and the introduced gaseous body comminuted, said gas contact and comminution being throughout the body of said liquid.

2. In a process for propagation of yeast in a liquid containing yeast nutrient materials, the improvement which consists in adding to the nutrient containing liquid an organic acid belonging to the group consisting of acetic and lactic acid, and subjecting the liquid during the propagation of yeast therein to the influence of air in the form of minute bubbles having diameters upwards to 6 mu., whereby the surface tension of the liquid is reduced and the introduced air comminuted, said aeration and comminution being thoroughout the body of said liquid.

3. In a process for propagation of yeast in a liquid containing yeast nutrient materials, the improvement which consists in effecting a lactic acid fermentation of a part of the liquid containing yeast nutrient materials whereby lactic acid is produced therein, propagating yeast in said nutrient liquid, and subjecting the liquid during the propagation to the influence of air in the form of minute bubbles having diameters upwards to 6 mu., whereby the surface tension of the liquid is reduced and the introduced air comminuted, said aeration and comminution being throughout the body of said liquid.

4. In a process for propagation of yeast in a liquid containing yeast nutrient materials, the improvement which consists in adding to the liquid containing yeast nutrient materials a salt of lactic acid and sulfuric acid whereby lactic acid is released in said liquid, propagating yeast therein, and subjecting the liquid during propagation to the influence of air in the form of minute bubbles having diameters upwards to 6 mu., whereby the surface tension of the liquid is reduced and the introduced air comminuted, said aeration and comminution being throughout the body of said liquid.

5. In a process for propagation of yeast in a liquid containing yeast nutrient materials, the improvement which consists in adding a small quantity of lactic acid to said nutrient containing liquid, propagating yeast therein, and aerating said liquid to saturation during the propagation by introducing air in the form of minute bubbles having diameters upwards to 6 mu., whereby the surface tension of the liquid is reduced and the introduced air comminuted, said aeration and comminution being throughout the body of said liquid.

6. In a process for propagation of yeast in a liquid containing yeast nutrient materials, the improvement which consists in adding a salt of lactic acid to the nutrient containing liquid, adding sulfuric acid to said liquid whereby lactic acid is released, the quantity of lactic acid released being such that 20 cc. of the yeast nutrient material containing liquid has a lactic acid acidity which will neutralize 0.2 cc. of normal sodium hydroxide solution, propagating the yeast in said liquid, and subjecting the liquid during propagation to the influence of air in the form of minute bubbles having diameters upwards to 6 mu., whereby the surface tension of the liquid is reduced and the introduced air comminuted, said aeration and comminution being throughout the body of said liquid.

ARNOLD BRAASCH.